(12) United States Patent
Fischer et al.

(10) Patent No.: US 7,387,814 B2
(45) Date of Patent: Jun. 17, 2008

(54) PROCESS FOR IN SITU COATING OF TURBO-MACHINE COMPONENTS

(75) Inventors: Marcus Fischer, Niederbreitbach (DE); Elmar Pfeiffer, Heinsberg (DE)

(73) Assignee: Siemens Aktiengesellschaft, Munich (DE)

( * ) Notice: Subject to any disclaimer, the term of this patent is extended or adjusted under 35 U.S.C. 154(b) by 244 days.

(21) Appl. No.: 11/291,591

(22) Filed: Nov. 30, 2005

(65) Prior Publication Data

US 2006/0147630 A1 Jul. 6, 2006

(30) Foreign Application Priority Data

Dec. 1, 2004 (EP) ................... 04028484

(51) Int. Cl.
*B05D 7/22* (2006.01)
(52) U.S. Cl. .............. 427/230; 427/231; 427/237; 427/346; 427/248.1; 427/212; 427/314; 427/372.2
(58) Field of Classification Search ............... None
See application file for complete search history.

(56) References Cited

U.S. PATENT DOCUMENTS

| | | | | |
|---|---|---|---|---|
| 3,779,345 A | * | 12/1973 | Barnes et al. | 184/6.4 |
| 3,884,041 A | * | 5/1975 | Zerlauth | 60/657 |
| 4,132,816 A | | 1/1979 | Benden et al. | |
| 5,235,745 A | * | 8/1993 | Fraser | 29/889.1 |
| 5,897,921 A | | 4/1999 | Borom et al. | |
| 6,024,792 A | | 2/2000 | Kurz et al. | |
| 6,180,170 B1 | | 1/2001 | Grossmann et al. | |
| 6,180,262 B1 | * | 1/2001 | Freling et al. | 428/633 |
| 6,203,851 B1 | | 3/2001 | Walter | |
| 6,585,569 B2 | | 7/2003 | Tomlinson | |
| 2003/0221315 A1 | * | 12/2003 | Baumann et al. | 29/889.1 |

FOREIGN PATENT DOCUMENTS

| | | |
|---|---|---|
| EP | 0 142 418 A1 | 5/1985 |
| EP | 0 486 489 B1 | 5/1992 |
| EP | 0 786 017 B1 | 7/1997 |
| EP | 0 892 090 A1 | 1/1999 |
| EP | 0 905 279 A1 | 3/1999 |
| EP | 0 934 795 A2 * | 8/1999 |
| EP | 1 204 776 B1 | 5/2002 |
| EP | 1 306 454 A1 | 5/2003 |
| EP | 1 319 729 A1 | 6/2003 |
| JP | 0 412 397 A1 | 2/1991 |
| JP | 06099125 A | 4/1994 |
| JP | 06219762 A | 8/1994 |
| WO | WO 99/67435 | 12/1999 |
| WO | WO 00/44949 | 8/2000 |

* cited by examiner

*Primary Examiner*—William P. Fletcher, III

(57) ABSTRACT

A method for coating a component of a turbo-machine. The method allows arranging a turbine rotor in the turbo-machine and introducing a coating material into the interior of the turbo-machine such that the rotor is coated. The rotor is rotated while it is being coated.

19 Claims, 5 Drawing Sheets

PROCESS FOR IN SITU COATING OF TURBO-MACHINE COMPONENTS

CROSS REFERENCE TO RELATED APPLICATION

This application claims priority of the European application No. 04028484.6 EP filed Dec. 01, 2004, which is incorporated by reference herein in its entirety.

FIELD OF THE INVENTION

The invention relates to a process for coating a component in accordance with the preamble of the claims.

BACKGROUND OF THE INVENTION

Components are often provided with layers in order to achieve a certain function, such as for example resistance to corrosion, oxidation and/or heat (thermal barrier). In this case, the coated components may also be rotating components, such as for example blades of a compressor or a turbine of a gas turbine installation which have layers protecting against erosion or heat. In the case of large machines, a rotor is composed of a large number of individual parts (a plurality of disks each having a plurality of turbine blades), which are coated individually or in groups, and consequently it takes a long time for all the individual parts to be coated.

JP 06 099 125 A discloses a coating apparatus in which the substrate is coated during rotation.

JP 06 219 762 A discloses a coating method in which a circular cutting tool is coated while it is rotating.

U.S. Pat. No. 5,897,921 discloses a process for applying a thermal barrier coating.

U.S. Pat. No. 6,585,569 B2 discloses a process for cleaning a compressor of a gas turbine in which dry ice is introduced into the turbine.

U.S. Pat. No. 6,180,262 discloses a process in which a plurality of dismantled turbine blades of a rotor are coated all at once.

Therefore, it is an object of the invention to overcome the above problem.

SUMMARY OF THE INVENTION

This object is achieved by the process as claimed.

The subclaims list further advantageous measures which can be combined with one another in any advantageous way.

The maintenance time for a turbine is considerably shortened by the process according to the invention, since, for example in the case of a gas turbine, there is no need to wait for the turbine and turbine housing to have cooled, and/or there is no need for forced cooling, and since it is not necessary to remove all the feed lines and outer parts of the housing. Also, the turbine does not have to be reassembled and started up again. This considerably reduces the maintenance time and the associated downtime for the operator of a turbine and obviates the need for heavy machines required to lift the housing parts.

DETAILED DESCRIPTION OF THE INVENTION

Figure 1:
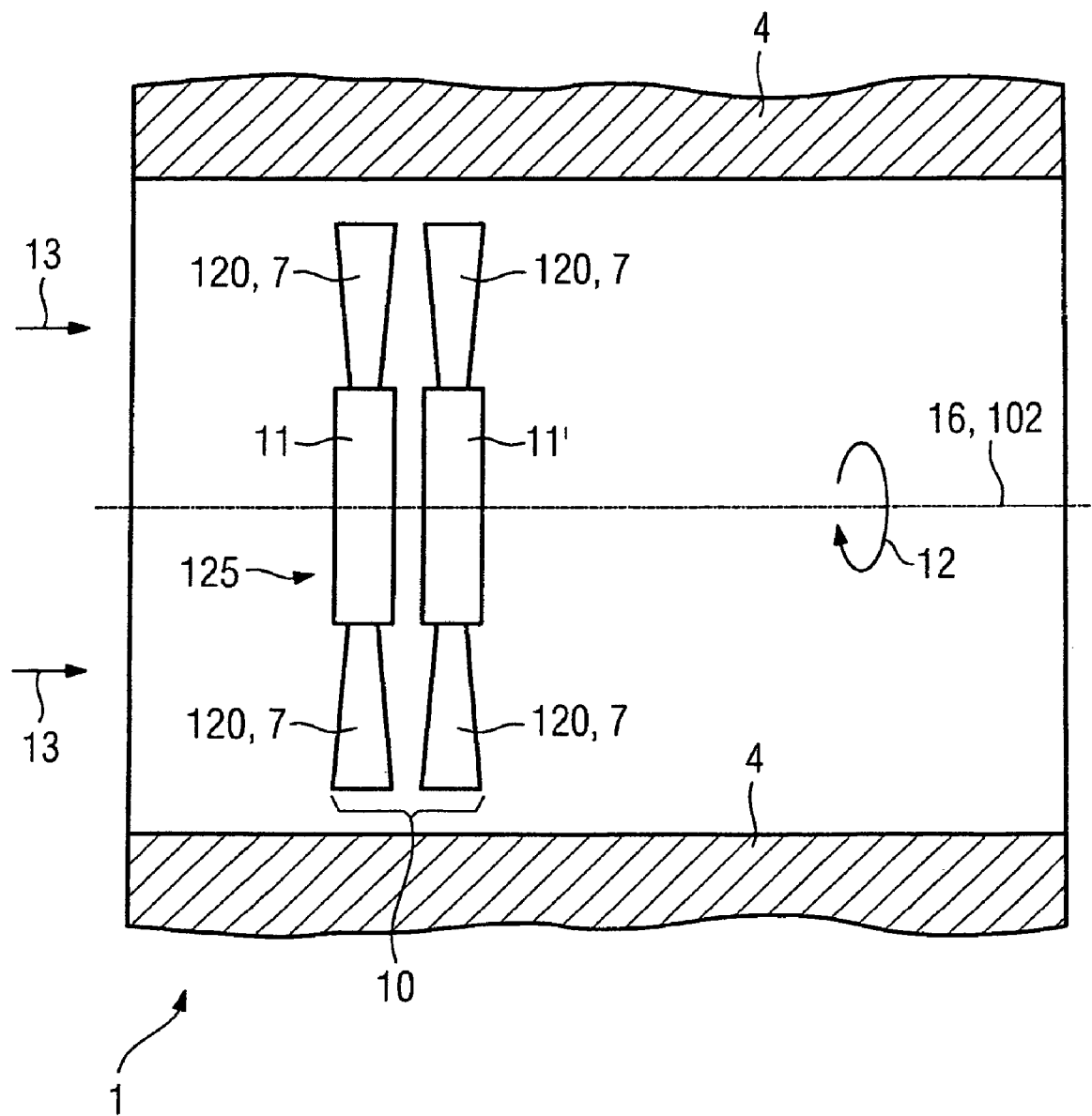
FIG. 1 diagrammatically depicts the process according to the invention.

FIG. 1 shows an apparatus 1 which includes a turbomachine with a rotor 10.

The rotor 10 is to be coated within the interior of a housing 4.

FIG. 1 diagrammatically depicts how the process according to the invention is to be carried out in order to coat the rotor 10. The rotor 10 comprises a plurality of parts 7, 120. In the case of a rotor 103 for a turbine 100, 300, 303 or of a compressor 105, the rotor 10, 103 has, for example, at least one disk 11, 11' 133 (FIG. 4), on which a plurality of turbine blades 120, 354 (FIG. 2, 4, 5) are arranged in a radial orientation distributed over the circumference.

The rotor 10 may comprise a plurality of disks 11, 11' each having a plurality of turbine blades 120, 354. A row 125 comprises, for example, a disk 11, 133 (FIG. 4) with turbine rotor blades 120.

Figure 4:
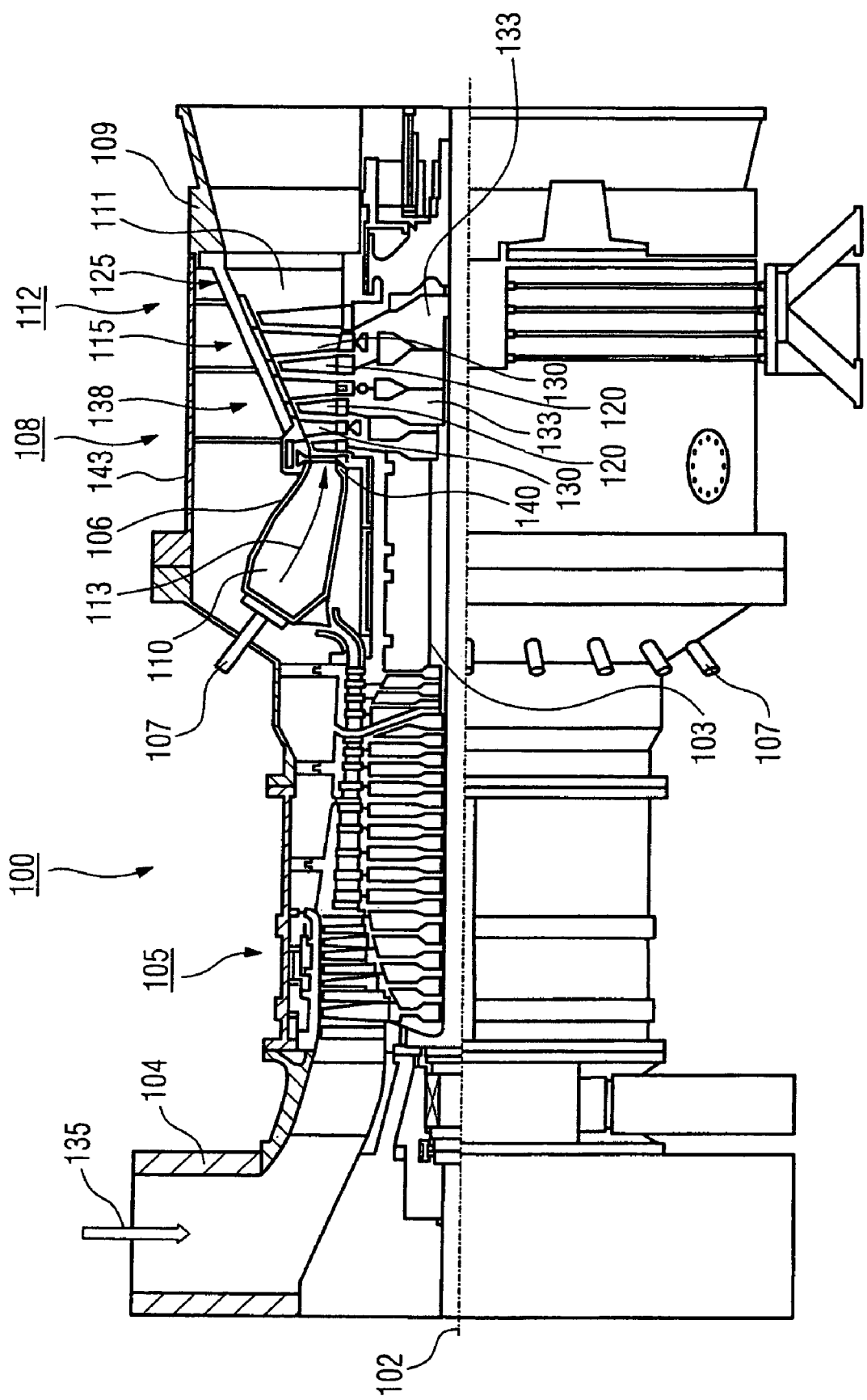
FIG. 4 shows a gas turbine.

The rotor 10, 103 is still arranged in its housing 4, 138 (FIG. 4) and can be rotated about a rotatable axis 16, 102 (FIG. 4).

The housing 4, 138 is, for example, the housing of a turbine 100, 300, 303 or of a compressor 105, in which the rotor 10, 103 is operated.

According to the invention, coating material 13 is applied while the rotor 10, 103 is therefore still in its installed position.

During the coating operation, the rotor 10 can also rotate about the axis of rotation 16, 102.

The coating material 13 may be in gas form, as in known from a PVD or CVD installation, and is then deposited on the surfaces of the parts 7, 120 that are to be coated.

The coating material 13 may also be applied to the parts 7 in liquid form, in particular finely dispersed in the air.

By way of example, it is also possible to apply a slip which contains a binder and powder particles, which then produce the definitive layer. In this case, the carrier medium can also be evaporated and the binder burnt out when the coating material 13 has been applied. Then, for example by further increasing the temperature, the powder particles are sintered together, so as to produce a fixed coating. The increase in temperature can be achieved by applying a flame to the components 7, 120 or, for example, by passing a hot gas or steam through the hollow turbine blades 120, which leads to heating of the coated component 7.

The coating of the rotor 10 can also be carried out while the rotor is operating. In this context, the term "operating" means that the rotor 10 is being used as intended. This means that the rotor of a compressor is compressing air, while a gas (steam, hot gas) is being expanded and performing work in the rotor of a turbine. Where the text refers to the rotor "rotating", this does not necessarily mean that the rotor is operating. The rotor 10 is in this case, for example, part of a compressor 105, for example, a gas turbine 100, in which case the coating material is added as an additive to the air that is to be compressed.

It is also possible for the rotor 10 to be a rotor 103 of a gas turbine 100, in which case the coating material 13 is added to the hot gas in operation during a reduction or increase in power of the gas turbine 100, in order to coat the rotor blades 120 and/or guide vanes 130 of the rotor.

Furthermore, in operation the temperature of the gas can be deliberately matched to the required thermal boundary conditions for the respective coating process by more or less fuel being burnt and less compressed air being fed from the compressor to the turbine or by the temperature of the steam being controlled.

The coating material 13 may contain a metal halide ($AlF_3$, $AlCl_3$, $CrF$, . . . ) which is in gas form or in the form of powder particles.

It is also possible for particles 13 in powder form (e.g. ceramics, hard metals) to be applied to the components 7, 120 that are to be coated, and these particles are then embedded on the region of the rotors 10, 103 which is close to the surface, if the surface or a layer in which the particles can be embedded is soft enough (for example by heating). These are, for example, coarser particles which are intended, for example, to increase the resistance to erosion of the component 7, 120.

The coating material 13 may, for example, be metallic (MCrAlX) or vitreous (compressor blade).

The coating process according to the invention can also be used to repair damaged blades or vanes of the compressor 105 or of the turbine 100, 300, 303. In this case, the material can be selected in such a way that it is preferentially deposited on the damaged areas.

If the rotor 10 is a rotor 103 of a gas turbine 100, the coating material 13 can, for example, be introduced into the combustion chamber 110 with the fuel, and the combustion of the fuel can heat the coating material 13, so that it is deposited on the components 7, 120 in a similar way to in the plasma spraying process.

It is also possible for the blades or vanes of a compressor, in particular of a compressor 105 of a turbine 100, to be coated.

When air is being compressed in the compressor, water precipitates and can form an electrolyte in combination with other elements contained in the air, which can lead to corrosion and erosion at the compressor blades or vanes. To prevent the corrosion and erosion, it is possible for compressor blades or vanes to be provided with coatings. A coating of this type comprises, for example, a basecoat and a topcoat. A suitable basecoat is in particular a coating which comprises an inorganic binder composed of chromium phosphate compounds and contains, for example, spherical aluminum particles. Coatings of this type are disclosed in EP 0 142 418 B1 or in EP 0 905 279 A1, with the layer composition and layer structure of these patents forming part of the present disclosure. The topcoat used may, for example, be water-based chromium phosphate compounds with inert fillers and colored pigmentations.

The same procedure can also be adopted for internal coating of a turbine 100 or a compressor 105. The turbine 100 comprises guide vanes 130 and a rotor 103 which has the rotor blades 120.

The coating material 13, as described above, is introduced into the turbine 100, with the coating material 13 being deposited both on the rotor 103 and on the guide vanes 130. The rotor 103 with the rotor blades 120 can in the process also rotate.

In this context, it is also possible to coat housing parts 4, 138 and blades and vanes 120, 130 or just the housing 4, 138.

This is done by controlled setting of temperature differences between housing 4, 138 and blades and vanes 120, 130. The hollow rotor blades 120 and the hollow guide vanes 130 have separate feeds leading into their cavity for supplying a medium, so that the rotor blades 120 can be heated while the guide vanes 130 are not, or vice versa. The appropriate growth conditions for a layer to grow on a substrate (blades or vanes) are only established at a certain elevated temperature, or only this elevated temperature makes it possible to ensure that the layer will not flake off a substrate which is too cold.

A combustion chamber 110 may likewise be a component of an apparatus 1, i.e. a gas turbine 100, which is to be coated. In this case too, the coating material is fed into the combustion chamber 110 from the outside. As with the turbine, this can take place during operation. In this case, the coating material can be supplied via the burner 107 and is then deposited on the heat shield elements 155, which have been suitably "temperature-controlled".

Another way of feeding the coating material to the combustion chamber or the turbine for the coating operation is for the coating material to be added to the flow medium within the turbine 100 at the compressor outlet.

Figure 2:
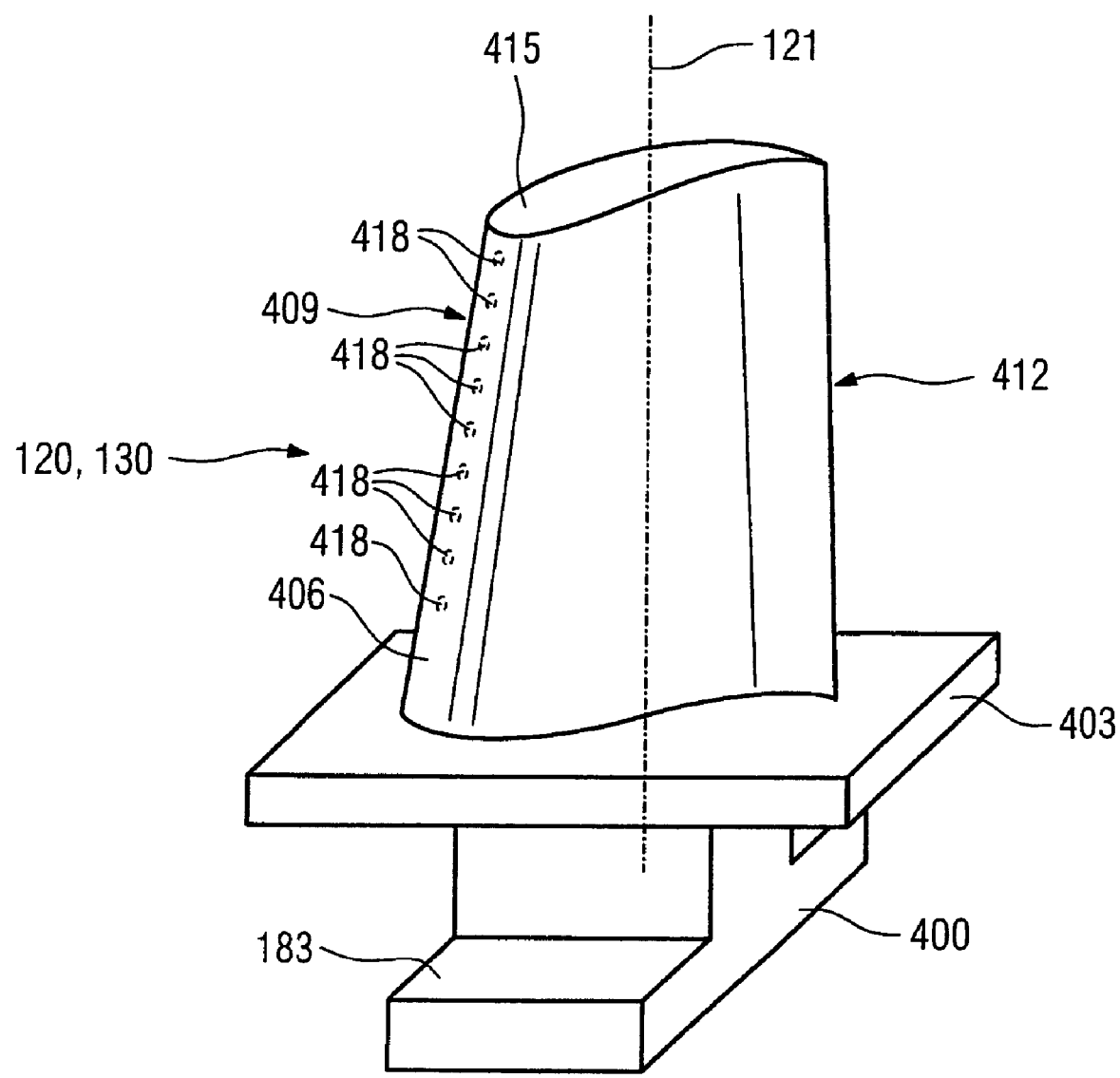
FIG. 2 shows a turbine blade or vane.

FIG. 2 shows a perspective view of a rotor blade 120 or guide vane 130 of a turbomachine, which extends along a longitudinal axis 121.

The turbomachine may be a gas turbine of an aircraft or of a power plant for generating electricity, a steam turbine or a compressor.

The blade or vane 120, 130 has, in succession along the longitudinal axis 121, a securing region 400, an adjoining blade or vane platform 403 and a main blade or vane part 406.

As a guide vane 130, the vane 130 may have a further platform (not shown) at its vane tip 415.

A blade or vane root 183, which is used to secure the rotor blades 120, 130 to a shaft or a disk (not shown), is formed in the securing region 400.

The blade or vane root 183 is designed, for example, in hammerhead form. Other configurations, such as a fir-tree or dovetail root, are possible.

The blade or vane 120, 130 has a leading edge 409 and a trailing edge 412 for a medium which flows past the main blade or vane part 406.

In the case of conventional blades or vanes 120, 130, by way of example solid metallic materials, in particular superalloys, are used in all regions 400, 403, 406 of the blade 120, 130.

Superalloys of this type are known, for example, from EP 1 204 776 B1, EP 1 306 454, EP 1 319 729 A1, WO 99/67435 or WO 00/44949; these documents form part of the disclosure. The blade or vane 120, 130 may in this case be produced by a casting process, also by means of directional solidification, by a forging process, by a milling process or combinations thereof.

Work pieces with a single-crystal structure or structures are used as components for machines which, in operation, are exposed to high mechanical, thermal and/or chemical stresses.

Single-crystal work pieces of this type are produced, for example, by directional solidification from the melt. This involves casting processes in which the liquid metallic alloy solidifies to form the single-crystal structure, i.e. the single-crystal work piece, or solidifies directionally.

In this case, dendritic crystals are oriented along the direction of heat flow and form either a columnar crystalline grain structure (i.e. grains which run over the entire length of the work piece and are referred to here, in accordance with the language customarily used, as directionally solidified) or a single-crystal structure, i.e. the entire work piece consists of one single crystal. In these processes, a transition to globular (polycrystalline) solidification needs to be avoided, since non-directional growth inevitably forms transverse and longitudinal grain boundaries, which negate the favorable properties of the directionally solidified or single-crystal component.

Where the text refers in general terms to directionally solidified micro structures, this is to be understood as meaning both single crystals, which do not have any grain boundaries or at most have small-angle grain boundaries, and columnar crystal structures, which do have grain boundaries running in the longitudinal direction but do not have any transverse grain boundaries. This second form of crystalline structures is also described as directionally solidified micro structures (directionally solidified structures).

Processes of this type are known from U.S. Pat. No. 6,024,792 and EP 0 892 090 A1; these documents form part of the disclosure.

The blades or vanes 120, 130 may likewise have coatings protecting against corrosion or oxidation (MCrAlX; M is at least one element selected from the group consisting of iron (Fe), cobalt (Co), nickel (Ni), X is an active element and represents yttrium (Y) and/or silicon (Si) and/or at least one rare earth element, or hafnium (Hf)). Alloys of this type are known from EP 0 486 489 B1, EP 0 786 017 B1, EP 0 412 397 B1 or EP 1 306 454 A1, which are intended to form part of the present disclosure.

It is also possible for there to be a thermal barrier coating, consisting for example of $ZrO_2$, $Y_2O_4$—$ZrO_2$, i.e. unstabilized, partially stabilized or completely stabilized by yttrium oxide and/or calcium oxide and/or magnesium oxide, to be present on the MCrAlX. Columnar grains are produced in the thermal barrier coating by means of suitable coating processes, such as for example electron beam physical vapor deposition (EB-PVD).

Refurbishment means that after they have been used, protective layers may have to be removed from components 120, 130 (e.g. by sand-blasting). Then, the corrosion and/or oxidation layers and products are removed. If appropriate, cracks in the component 120, 130 are also repaired by soldering or welding. This is followed by recoating of the component 120, 130, after which the component 120, 130 can be reused.

The blade or vane 120, 130 may be hollow or solid in form. If the blade or vane 120, 130 is to be cooled, it is hollow and may also have film-cooling holes 418 (indicated by dashed lines).

Figure 3:
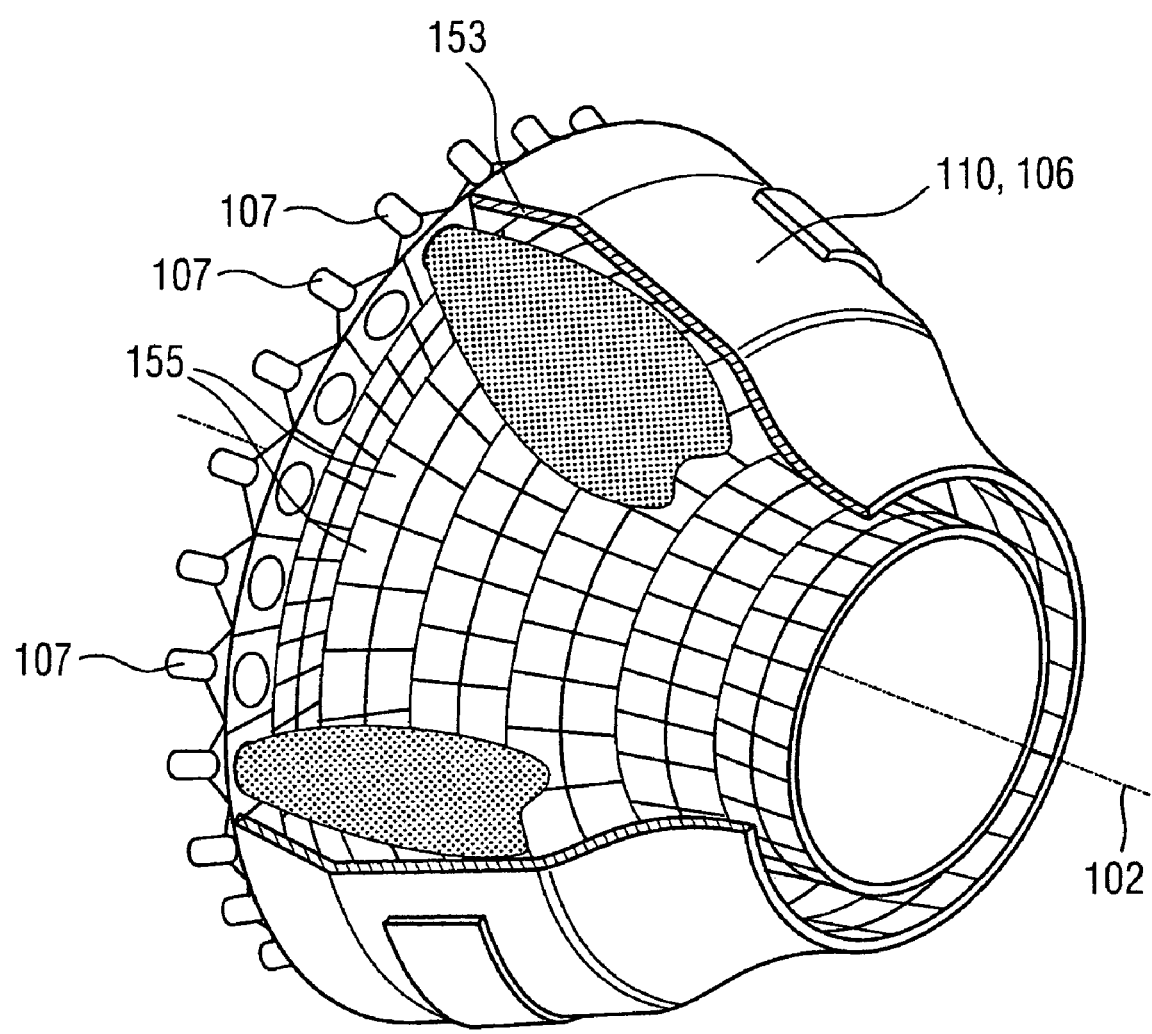
FIG. 3 shows a combustion chamber.

FIG. 3 shows a combustion chamber 110 of a gas turbine. The combustion chamber 110 is configured, for example, as what is known as an annular combustion chamber, in which a multiplicity of burners 107 arranged circumferentially around the axis of rotation 102 open out into a common combustion chamber space. For this purpose, the combustion chamber 110 overall is of annular configuration positioned around the axis of rotation 102.

To achieve a relatively high efficiency, the combustion chamber 110 is designed for a relatively high temperature of the working medium M of approximately 1000° C. to 1600° C. To allow a relatively long service life even with these operating parameters, which are unfavorable for the materials, the combustion chamber wall 153 is provided, on its side which faces the working medium M, with an inner lining formed from heat shield elements 155.

On the working medium side, each heat shield element 155 is equipped with a particularly heat-resistant protective layer or is made from material that is able to withstand high temperatures. These may be solid ceramic bricks or alloys with MCrAlX and/or ceramic coatings. The materials of the combustion chamber wall and their coatings may be similar to the turbine blades or vanes.

A cooling system may also be provided for the heat shield elements 155 and/or their holding elements, on account of the high temperatures in the interior of the combustion chamber 110.

FIG. 4 shows, by way of example, a partial longitudinal section through a gas turbine 100.

In the interior, the gas turbine 100 has a rotor 103 which is mounted such that it can rotate about an axis of rotation 102 and is also referred to as the turbine rotor.

An intake housing 104, a compressor 105, a, for example, toroidal combustion chamber 110, in particular an annular combustion chamber 106, with a plurality of coaxially arranged burners 107, a turbine 108 and the exhaust-gas housing 109 follow one another along the rotor 103.

The annular combustion chamber 106 is in communication with a, for example, annular hot-gas passage 111, where, by way of example, four successive turbine stages 112 form the turbine 108.

Each turbine stage 112 is formed, for example, from two blade or vane rings. As seen in the direction of flow of a working medium 113, in the hot-gas passage 111 a row of guide vanes 115 is followed by a row 125 formed from rotor blades 120.

The guide vanes 130 are secured to an inner housing 138 of a stator 143, whereas the rotor blades 120 of a row 125 are fitted to the rotor 103 for example by means of a turbine disk 133. A generator (not shown) is coupled to the rotor 103.

While the gas turbine 100 is operating, the compressor 105 sucks in air 135 through the intake housing 104 and compresses it. The compressed air provided at the turbine-side end of the compressor 105 is passed to the burners 107, where it is mixed with a fuel. The mix is then burnt in the combustion chamber 110, forming the working medium 113. From there, the working medium 113 flows along the hot-gas passage 111 past the guide vanes 130 and the rotor blades 120. The working medium 113 is expanded at the rotor blades 120, transferring its momentum, so that the rotor blades 120 drive the rotor 103 and the latter in turn drives the generator coupled to it.

While the gas turbine 100 is operating, the components which are exposed to the hot working medium 113 are subject to thermal stresses. The guide vanes 130 and rotor blades 120 of the first turbine stage, as seen in the direction of flow of the working medium 113, together with the heat shield bricks which line the combustion chamber 106, are subject to the highest thermal stresses.

To be able to withstand the temperatures which prevail there, they have to be cooled by means of a coolant.

Substrates of the components may likewise have a directional structure, i.e. they are in single-crystal form (SX structure) or have only longitudinally oriented grains (DS structure).

By way of example, iron-base, nickel-base or cobalt-base superalloys are used as material for the components, in particular for the turbine blade or vane 120, 130 and components of the combustion chamber 110.

Superalloys of this type are known, for example, from EP 1 204 776 B1, EP 1 306 454, EP 1 319 729 A1, WO 99/67435 or WO 00/44949; these documents form part of the disclosure.

The blades or vanes 120, 130 may also have coatings which protect against corrosion (MCrAlX; M is at least one element selected from the group consisting of iron (Fe), cobalt (Co), nickel (Ni), X is an active element and represents yttrium (Y) and/or silicon and/or at least one rare earth element or hafnium). Alloys of this type are known from EP 0 486 489 B1, EP 0 786 017 B1, EP 0 412 397 B1 or EP 1 306 454 A1, which are intended to form part of the present disclosure.

A thermal barrier coating, consisting for example of $ZrO_2$, $Y_2O_4$—$ZrO_2$, i.e. unstabilized, partially stabilized or completely stabilized by yttrium oxide and/or calcium oxide and/or magnesium oxide, may also be present on the MCrAlX. Columnar grains are produced in the thermal barrier coating by suitable coating processes, such as for example electron beam physical vapor deposition (EB-PVD).

The guide vane 130 has a guide vane root (not shown here), which faces the inner housing 138 of the turbine 108, and a guide vane head which is at the opposite end from the guide vane root. The guide vane head faces the rotor 103 and is fixed to a securing ring 140 of the stator 143.

Figure 5:
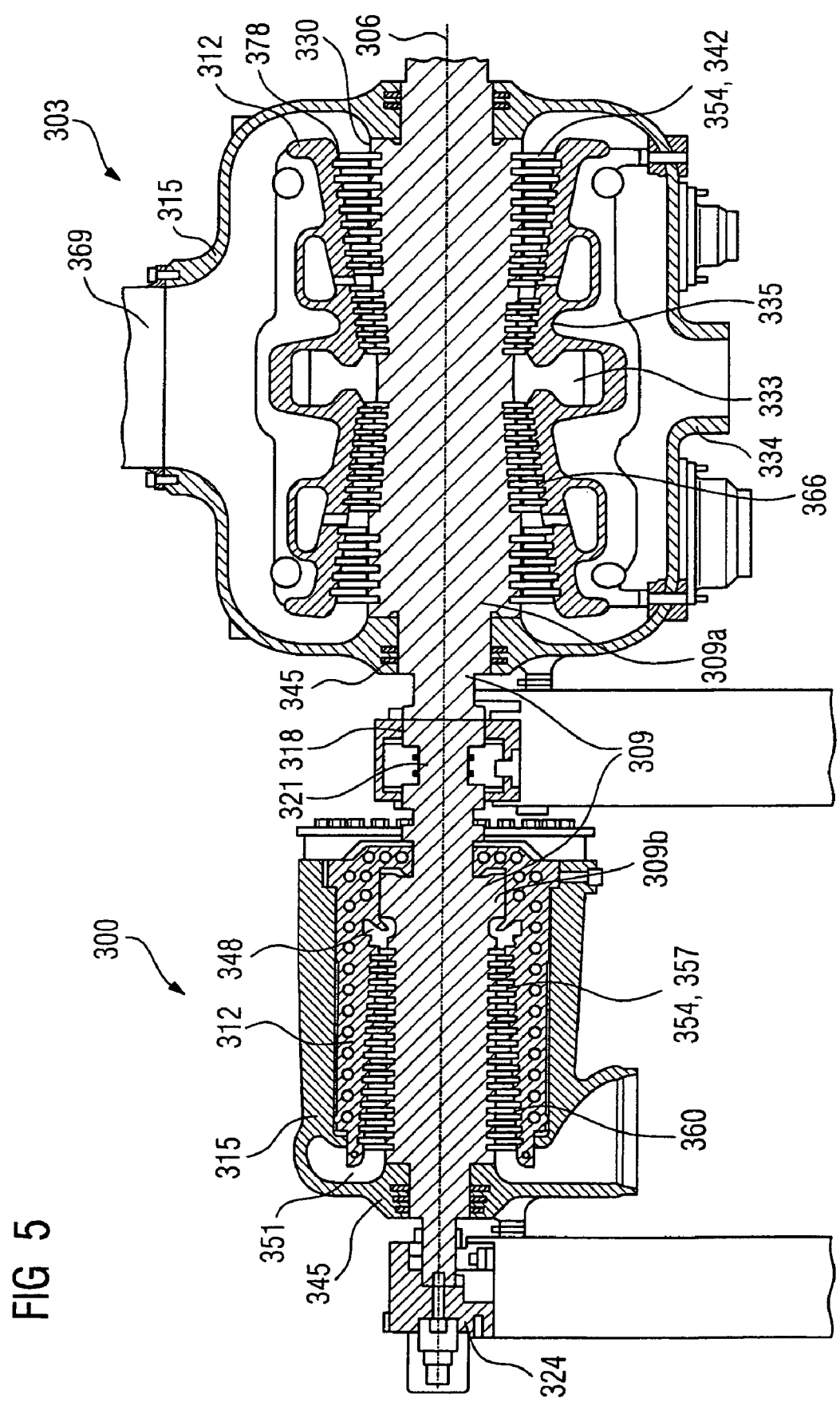
FIG. 5 shows a steam turbine.

FIG. 5 illustrates, by way of example, a steam turbine 300, 303 with a turbine shaft extending along an axis of rotation 306.

The steam turbine has a high-pressure partial turbine 300 and a medium-pressure partial turbine 303, each with an inner housing 312 and an outer housing 315 surrounding it.

The high-pressure partial turbine 300 is, for example, of pot-like configuration.

The medium-pressure partial turbine 303 is of two-flow design.

It is also possible for the medium-pressure partial turbine 303 to be of single-flow design.

A bearing 318 is arranged between the high-pressure partial turbine 300 and the medium-pressure partial turbine 303 along the axis of rotation 306, the turbine shaft 309 having a bearing region 321 in the bearing 318. The turbine shaft 309 is mounted on a further bearing 324 next to the high-pressure partial turbine 300. In the region of this bearing 324, the high-pressure partial turbine 300 has a shaft seal 345. The turbine shaft 309 is sealed by two further shaft seals 345 with respect to the outer housing 315 of the medium-pressure partial turbine 303. Between a high-pressure steam inlet region 348 and a steam outlet region 351, the turbine shaft 309 has the high-pressure rotor blading 354, 357 in the high-pressure partial turbine 300. This high-pressure rotor blading 354, 357, together with the associated rotor blades (not shown in more detail), represents a first blading region 360. The medium-pressure partial turbine 303 has a central steam inlet region 333. Assigned to the steam inlet region 333 the turbine shaft 309 has a radially symmetrical shaft shield, a covering plate, on the one hand for dividing the flow of steam into the two flows for the medium-pressure partial turbine 303 and for preventing direct contact between the hot steam and the turbine shaft 309. In the medium-pressure partial turbine 303, the turbine shaft 309 has a second blading region 366 comprising the medium-pressure rotor blades 354, 342. The hot steam which flows through the second blading region 366 flows out of the medium-pressure partial turbine 303 from an outlet connection piece 369 to a low-pressure partial turbine, which is connected downstream in terms of flow but is not illustrated.

The invention claimed is:

1. A method for coating a component of a turbo-machine, comprising:
    arranging a turbine rotor in the turbo-machine;
    introducing a thermal barrier coating material into the interior of the turbo-machine such that the rotor is coated; and
    rotating the rotor while it is being coated.

2. The method as claimed in claim 1, wherein the component to be coated is a rotor of a turbine that has rotor blades and the turbine has guide vanes that are also coated.

3. The method as claimed in claim 2, wherein the rotor is coated while the turbo-machine is being operated.

4. The method as claimed in claim 2, wherein the rotor is at least partially heated during the coating operation.

5. The method as claimed in claim 2, wherein the rotor is a steam turbine rotor, a gas turbine rotor, or a compressor rotor of a turbo-machine.

6. The method as claimed in claim 1, wherein the coating material is at least partially in a gas form.

7. The method as claimed in claim 1, wherein the coating material is at least partially in a liquid form.

8. The method as claimed in claim 1, wherein the coating material is at least partially in a powder form.

9. The method as claimed in claim 1, wherein the coating material includes a binder that is burnt out before or during operation of the turbo-machine.

10. The method as claimed in claim 1, wherein the coating material contains a metal halide.

11. The method as claimed in claim 1, wherein the coating material is heated.

12. The method as claimed in claim 1, wherein the coating material is introduced through a combustion chamber to the component to be coated.

13. The method as claimed in claim 12, wherein the coating material is introduced into the combustion chamber with a fuel and the fuel is burnt.

14. The method as claimed in claim 12, wherein the method is used for the repair coating of the rotor.

15. The method as claimed in claim 14, wherein the coating material for the coating is selected to be deposited on the damaged regions of the rotor.

16. The method as claimed in claim 1, wherein the rotor has a plurality of rows arranged in succession and each row includes a plurality of turbine blades or vanes, which are coated.

17. The method as claimed in claim 1, wherein a housing of a turbine is coated as a result of the coating being introduced into the turbo-machine.

18. A method for coating a combustion chamber of a turbo-machine, comprising introducing a coating material into the interior of the turbo-machine such that a heat shield of the combustion chamber is coated.

19. The method as claimed in claim 18, wherein the coating material is added to a compressor of a gas turbine, so that it is deposited within the combustion chamber.

* * * * *